(12) United States Patent
Bai et al.

(10) Patent No.: US 10,936,096 B2
(45) Date of Patent: Mar. 2, 2021

(54) DISPLAY MODULE AND ELECTRONIC EQUIPMENT

(71) Applicant: WUHAN CHINA STAR OPTOELECTRONICS SEMICONDUCTOR DISPLAY TECHNOLOGY CO., LTD., Hubei (CN)

(72) Inventors: Siqin Bai, Hubei (CN); Yong Zhao, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 105 days.

(21) Appl. No.: 16/463,984

(22) PCT Filed: Jan. 21, 2019

(86) PCT No.: PCT/CN2019/072568
§ 371 (c)(1),
(2) Date: May 24, 2019

(87) PCT Pub. No.: WO2020/098153
PCT Pub. Date: May 22, 2020

(65) Prior Publication Data
US 2021/0011566 A1 Jan. 14, 2021

(30) Foreign Application Priority Data
Nov. 14, 2018 (CN) .......................... 201811352510.X

(51) Int. Cl.
*G06F 3/041* (2006.01)
*G06F 1/16* (2006.01)

(52) U.S. Cl.
CPC ............ *G06F 3/041* (2013.01); *G06F 1/1652* (2013.01); *G06F 2203/04102* (2013.01)

(58) Field of Classification Search
CPC .................. G06F 1/1652; G06F 3/041; G06F 2203/04102
See application file for complete search history.

(56) References Cited

U.S. PATENT DOCUMENTS 9,735,221 B2 * 8/2017 Fukuma ................. H05K 1/147
2016/0190510 A1 * 6/2016 Li .......................... G02F 1/1345
257/40
2016/0313834 A1 * 10/2016 Ma ......................... G06F 3/0416
(Continued)

FOREIGN PATENT DOCUMENTS

CN   106502439 A  *  3/2017
CN   106502439 A     3/2017
(Continued)

*Primary Examiner* — Joe H Cheng
(74) *Attorney, Agent, or Firm* — Hauptman Ham, LLP

(57) ABSTRACT

The present disclosure provides a display module and an electronic equipment. The display module includes: a display panel including a first notch near a boundary of the display panel; a touch layer disposed over the display panel; and a touch flexible circuit board electrically connected to the touch layer, where the touch flexible circuit board is disposed adjacent to the first notch and is bent to a side of the display panel away from the touch layer.

10 Claims, 4 Drawing Sheets

(56) References Cited

U.S. PATENT DOCUMENTS

| | | | | |
|---|---|---|---|---|
| 2017/0192565 A1* | 7/2017 | Pan | .................... | G06F 3/04164 |
| 2017/0289324 A1* | 10/2017 | Yeo | ........................ | G03B 29/00 |
| 2018/0011373 A1* | 1/2018 | Zhou | .................... | G02F 1/1339 |
| 2019/0050094 A1* | 2/2019 | Zeng | .................... | G06F 1/1643 |
| 2019/0182573 A1* | 6/2019 | Shin | ...................... | G06F 1/1616 |
| 2019/0196248 A1* | 6/2019 | Cheng | .................. | G06F 1/1637 |

FOREIGN PATENT DOCUMENTS

| | | | | |
|---|---|---|---|---|
| CN | 107343060 A | | 11/2017 | |
| CN | 107368217 A | * | 11/2017 | |
| CN | 107393422 A | * | 11/2017 | ............ G06F 3/041 |
| CN | 107765919 A | | 3/2018 | |
| CN | 108052233 A | * | 5/2018 | |
| CN | 108052233 A | | 5/2018 | |

* cited by examiner

DISPLAY MODULE AND ELECTRONIC EQUIPMENT

CROSS REFERENCE TO RELATED APPLICATIONS

This application is a national stage of PCT/CN2019/072568, filed on Jan. 21, 2019 and claims priority to Chinese Application NO. 201811352510.X, filed on Nov. 14, 2018, the content of which herein is incorporated by reference in its entirety.

FIELD OF DISCLOSURE

The present disclosure relates to the field of displays, and in particular, to a display module and an electronic equipment.

BACKGROUND

In existing displays, full screen products are classified into special-shaped screens and non-special-shaped screens. With increasing demand for a higher screen-to-body ratio, the special-shaped screens have been quite successful in mobile phone markets. The special-shaped screens are formed by cutting a notch on an upper side of conventional display screens for mounting a camera, an earpiece, and the like. The demand for the higher screen-to-body ratio is a challenge for a width of lower borders of the screens. The lower borders are getting narrower and narrower, and a setting of a binding layer of a touch layer has become an urgent issue for touch screen manufacturers.

Referring to FIG. 1, which is a structural diagram of film layers of a lower border of a display module in the prior art.

The display module includes a backplane 101, a flexible substrate 102, a light-emitting device layer (not shown), an adhesive layer 103, a touch layer 104, and a touch flexible circuit board 105. The touch flexible circuit board includes a bending area. A boundary width of a lower border of the display module includes a boundary width L1 of the touch layer and a width L2 of the bending area of the touch flexible circuit board.

In the prior art, the boundary width L1 of the touch layer can only be minimized to 1.5 mm, and the width L2 of the bending area of the touch flexible circuit board can be minimized to 0.5 mm. Nowadays, the boundary width of the lower border of about 2 mm can no longer meet the market's increasingly demand for narrow borders.

Accordingly, it is necessary to provide a display module to solve the technical problems in the prior art.

SUMMARY OF DISCLOSURE

The present disclosure provides a display module and electronic equipment to solve the technical problems of a larger border of an existing display panel.

In order to solve the above problems, the technical solution provided by the present disclosure is as follows.

The present disclosure provides display module, including:

a display panel including a first notch near a boundary of the display panel;

a touch layer disposed over the display panel; and a touch flexible circuit board electrically connected to the touch layer;

the touch flexible circuit board is disposed adjacent to the first notch and is bent to a side of the display panel away from the touch layer.

In the display module of the present disclosure, the touch flexible circuit board includes a first bending area; and an orthographic projection of the first bending area on the first notch is located within the first notch.

In the display module of the present disclosure, the display panel includes a flexible substrate; and the flexible substrate includes a second bending area, and the second bending area is disposed near the first notch, and the second bending area is bent to the side of the display panel away from the touch layer.

In the display module of the present disclosure, the second bending area is disposed away from the first notch, and the second bending area is bent to the side of the display panel away from the touch layer.

In the display module of the present disclosure, another orthographic projection of the second bending area on the first notch is located within the first notch.

In the display module of the present disclosure, the second bending area includes a first area, a second area, and a third area, the first area and the third area are adjacent to the backplane, and the second area is located between the first area and the third area; and a radius of curvature of the first area is greater than a radius of curvature of the second area, and a radius of curvature of the third area is greater than the radius of curvature of the second area.

In the display module of the present disclosure, a bending radius of the first bending area is greater than a bending radius of the second bending area.

In the display module of the present disclosure, the touch flexible circuit board is electrically connected to the touch layer by an anisotropic conductive adhesive.

In the display module of the present disclosure, a shape of the first notch includes one of a rectangle, a square, or a semi-oval shape.

The present disclosure also provides an electronic equipment, including a display module, where the display module includes:

a display panel including a first notch near a boundary of the display panel;

a touch layer disposed over the display panel; and a touch flexible circuit board electrically connected to the touch layer;

the touch flexible circuit board is disposed adjacent to the first notch and is bent to a side of the display panel away from the touch layer.

In the electronic equipment of the present disclosure, the touch flexible circuit board includes a first bending area; and an orthographic projection of the first bending area on the first notch is located within the first notch.

In the electronic equipment of the present disclosure, the display panel includes a flexible substrate; and the flexible substrate includes a second bending area, and the second bending area is disposed near the first notch, and the second bending area is bent to the side of the display panel away from the touch layer.

In the electronic equipment of the present disclosure, the second bending area is disposed away from the first notch, and the second bending area is bent to the side of the display panel away from the touch layer.

In the electronic equipment of the present disclosure, another orthographic projection of the second bending area on the first notch is located within the first notch.

In the electronic equipment of the present disclosure, the second bending area includes a first area, a second area, and a third area, the first area and the third area are adjacent to the backplane, and the second area is located between the first area and the third area; and a radius of curvature of the first area is greater than a radius of curvature of the second area, and a radius of curvature of the third area is greater than the radius of curvature of the second area.

In the electronic equipment of the present disclosure, a bending radius of the first bending area is greater than a bending radius of the second bending area.

In the electronic equipment of the present disclosure, the touch flexible circuit board is electrically connected to the touch layer by an anisotropic conductive adhesive.

In the electronic equipment of the present disclosure, a shape of the first notch includes one of a rectangle, a square, or a semi-oval shape.

Advantages of the present disclosure are as follows. In the present disclosure, a width of a bending section of a lower border of the display panel is reduced by setting the touch flexible circuit board in a notch area of the special-shaped screen, thereby narrowing the lower border of the display module, and implementing a narrow border design.

BRIEF DESCRIPTION OF DRAWINGS

In order to illustrate the technical proposal of implementations of the embodiments of the present disclosure or existing technology clearly, with reference to the accompanying drawings, the description of the implementations of the present disclosure or existing technology are given as following briefly. Obviously, the given accompanying drawings are only implementations of the present disclosure, so that, those of ordinary skill in the art could get other accompanying drawings in accordance with the accompanying drawings without devoting a creative effort.

DETAILED DESCRIPTION

Figure 1:
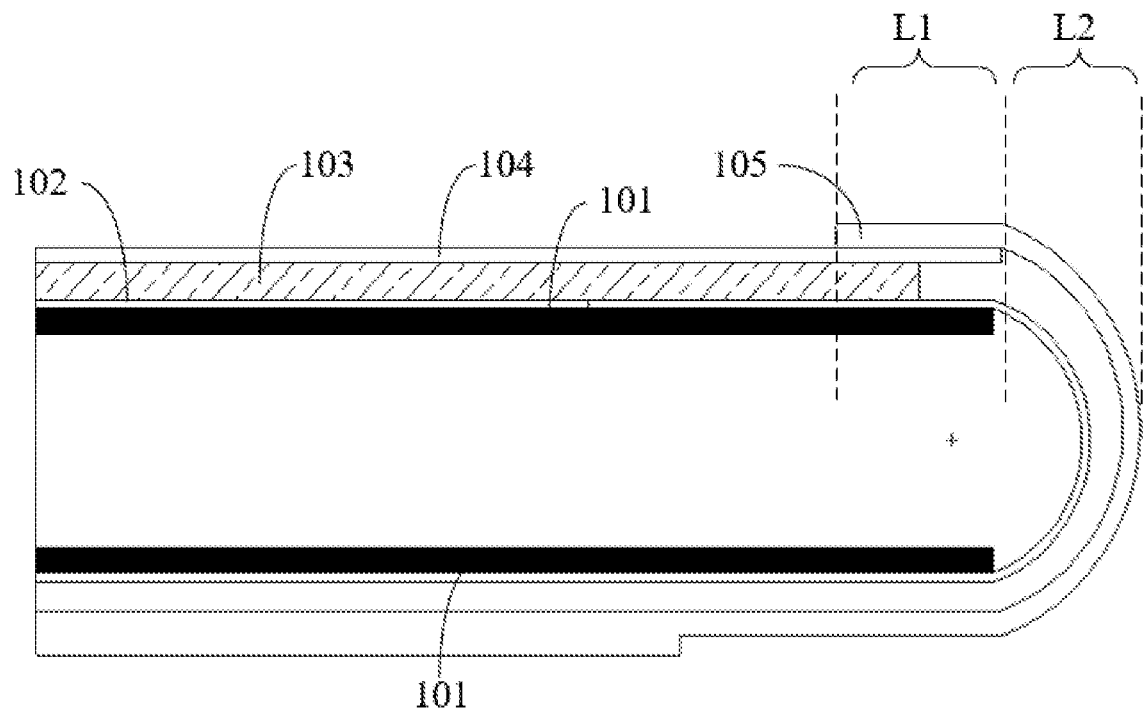
FIG. 1 is a structural diagram of film layers of a lower border of a display module in the prior art.

The foregoing objects, features and advantages adopted by the present disclosure can be best understood by referring to the following detailed description of the preferred embodiments and the accompanying drawings. Furthermore, directional terms described in the present disclosure, such as upper, lower, front, rear, left, right, inner, outer, side and etc., are only directions referring to the accompanying drawings, so that the used directional terms are used to describe and understand the present disclosure, but the present disclosure is not limited thereto. In the drawings, similar structural units are designated by the same reference numerals.

Figure 2:
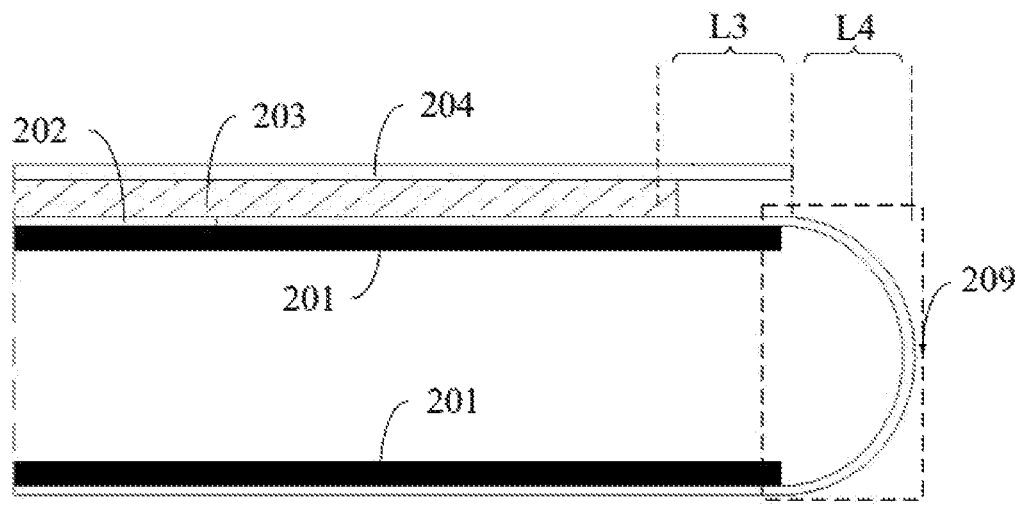
FIG. 2 is a structural diagram of film layers of a lower border of a display module of a first embodiment of the present disclosure.

Referring to FIG. 2, which is a structural diagram of film layers of a lower border of a display module of a first embodiment of the present disclosure.

Figure 3:
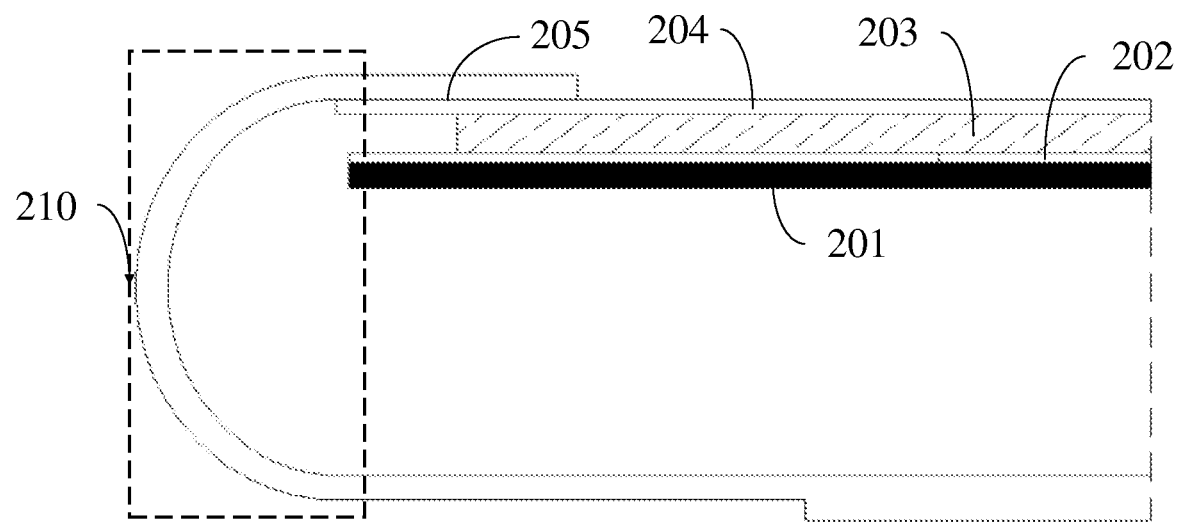
FIG. 3 is a structural diagram of film layers of an upper border of the display module of the first embodiment of the present disclosure.

Referring to FIG. 3, which is a structural diagram of film layers of an upper border of the display module of the first embodiment of the present disclosure.

The display module includes a supporting layer (not shown), a backplane 201 disposed over the supporting layer, a display panel 202 disposed on the backplane 201, an adhesive layer 203 disposed on the display panel 202, a touch layer 204 disposed on the adhesive layer 203, and a touch flexible circuit board 205 electrically connected to the touch layer 204.

The supporting layer is a base of the display module, and is mainly configured to support a film structure on the supporting layer.

The backplane 201 is disposed on both sides of the supporting layer, and the backplane includes a first backplane and a second backplane.

The display panel 202 is disposed on the first backplane.

In one embodiment, the display panel 202 can be a liquid crystal display (LCD) display, an organic light emitting diode (OLED) display, or other types of display screens, and is not limited thereto.

The display panel 202 includes a base substrate, a thin film transistor layer disposed on the base substrate, a light-emitting device layer disposed on the thin film transistor layer, and an encapsulation layer disposed on the light-emitting device layer.

In one embodiment, if the base substrate is a rigid substrate, raw material of the base substrate may be one of a glass substrate, a quartz substrate, a resin substrate, and the like. If the base substrate is a flexible substrate, a flexible material may be a polyimide film.

The display panel 202 includes a special-shaped display area, a first notch 206 located at one end of the special-shaped display area, and a bending section located at another end of the special-shaped display area.

Figure 4:
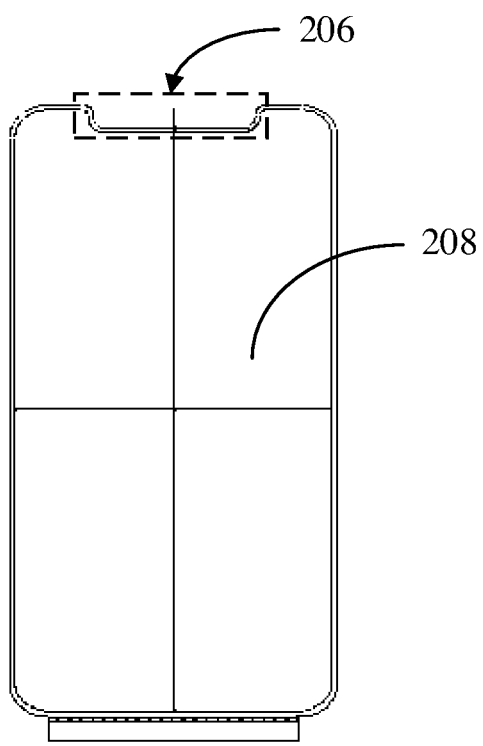
FIG. 4 is a flat development view of a display panel of the display module of the first embodiment of the present disclosure.

Referring to FIG. 4, which is a flat development view of a display panel of the display module of the first embodiment of the present disclosure.

The display panel 202 includes the special-shaped display area 208, the first notch 206 located on an upper border of the special-shaped display area 208, and the second bending area 209 located on a lower border the special-shaped display area 208.

The second bending area 209 is disposed away from the first notch 206, and the second bending area 209 is bent to a side of the display panel 202 away from the touch layer 204.

In one embodiment, the touch layer 204 disposed on the adhesive layer 203 may be one of self-capacitance or mutual capacitance, and is not limited.

The touch flexible circuit board 205 is electrically connected to the touch layer 204.

The touch flexible circuit board 205 is disposed adjacent to the first notch 206 and is bent to the side of the display panel 202 away from the touch layer 204.

Referring to FIG. 3, one end of the touch flexible circuit board 205 is electrically connected to the touch layer 204, and the other end of the touch flexible circuit board 205 is bent to the side of the display panel 202 away from the touch layer 204.

In one embodiment, the touch flexible circuit board 205 includes a first bending area 210. An orthographic projection of the first bending area 210 on the first notch 206 is located within the first notch 206. A width of the touch flexible circuit board 205 is less than the a width of the first notch 206, such that the touch flexible circuit board 205 does not intersect with the display panel 202 when it is bent to a back of the display panel 202. A specific shape of the touch flexible circuit board 205 of the present disclosure is not specifically limited.

The touch layer 204 also includes a touch sensing electrode lead and a touch scanning electrode lead. The touch sensing electrode lead and the touch scanning electrode lead are both bound to the touch flexible circuit board 205, and are connected to a touch controlling chip through the touch flexible circuit board 205, such that touch sensing lines and the touch scanning lines are respectively led out by the touch sensing electrode lead and the touch scanning electrode lead, thereby realizing input and output of signals to the touch sensing lines and the touch scanning lines.

A bending radius of the first bending area 210 is greater than a bending radius of the second bending area 209.

In one embodiment, in order to ensure that the lower border of the display panel 202 has a smaller width, the second bending area 209 may be a non-standard semicircle.

The second bending area 209 includes a first area, a second area, and a third area. The first area and the third area are adjacent to the backplane 201, and the second area is disposed between the first area and the third area. A radius of curvature of the first area is greater than a radius of curvature of the second area. A radius of curvature of the third area is greater than a radius of curvature of the second area.

In comparison to the prior art, the width of the lower border of the display panel 202 of this embodiment includes only a boundary width L3 of the touch layer 204 and a width L4 of the bending area of the flexible substrate. The width L2 of the bending area of the touch flexible circuit board 105 is greater than the width L4 of the bending area of the flexible substrate. Also, the touch flexible circuit board 205 is moved into the first notch 206, such that the boundary width L1 of the touch layer is larger than the boundary width L3 of the touch layer. That is, the lower border of the display module is reduced.

In this embodiment, a width of a bending section of a lower border of the display panel 202 is reduced by setting the touch flexible circuit board 205 in a notch area of the special-shaped screen, thereby narrowing the lower border of the display module, and implementing a narrow border design.

Figure 5:
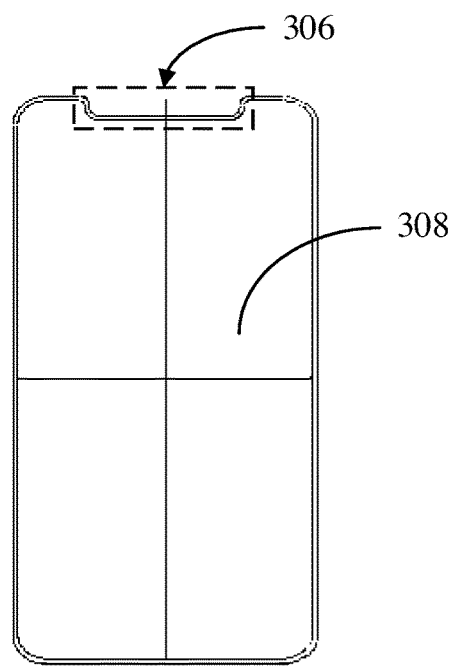
FIG. 5 is a flat development view of a display panel of a display module of a second embodiment of the present disclosure.

Referring to FIG. 5, which is a flat development view of a display panel of a display module of a second embodiment of the present disclosure.

A display panel 302 includes a special-shaped display area 308, a first notch 306 located at an upper border of the special-shaped display area 308, and a second bending area 309 located in the first notch 306.

The second bending area 309 is disposed adjacent to the first notch 306, and the second bending area 309 is bent to a side of the display panel 302 away from the touch layer 304.

Figure 6:
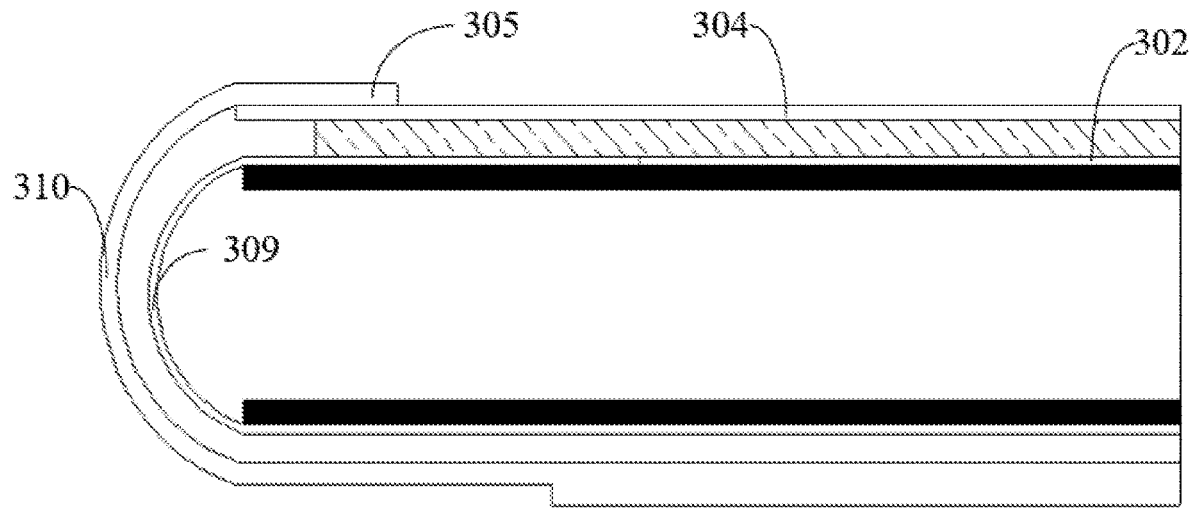
FIG. 6 is a structural diagram of film layers of an upper border of the display module of the second embodiment of the present disclosure.

Referring to FIG. 6, which is a structural diagram of film layers of an upper border of the display module of the second embodiment of the present disclosure.

Figure 7:
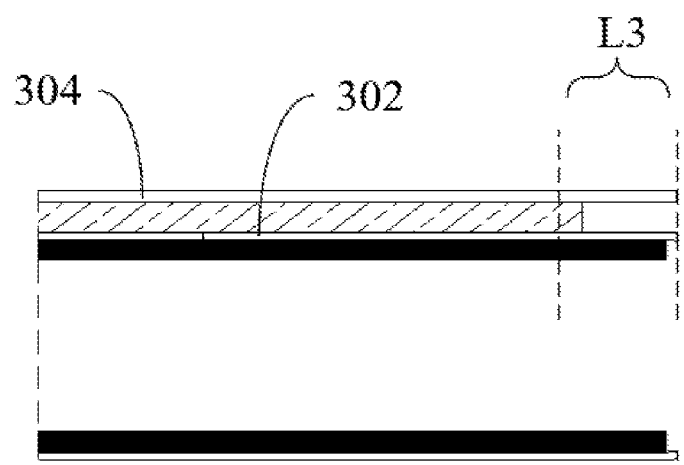
FIG. 7 is a structural diagram of film layers of a lower border of the display module of the second embodiment of the present disclosure.

Referring to FIG. 7, which is a structural diagram of film layers of a lower border of the display module of the second embodiment of the present disclosure.

The first bending area 310 of the touch flexible circuit board 305 and the second bending area 309 of the flexible substrate are both located in the first notch 306 of the display panel 302 and are bent to the side of the display panel 302 away from the touch layer 304.

In comparison to the prior art, a width of the lower border of the display panel 302 in this embodiment only includes a boundary width L3 of the touch layer 304, and a width L4 of the bending area of the touch flexible circuit board 305 is removed. That is, the lower border of the display module is narrowed.

In the first embodiment and the second embodiment of the present disclosure, the touch flexible circuit board is electrically connected to the touch layer by an anisotropic conductive adhesive.

In one embodiment, a shape of the first notch may be one of a rectangle, a square, or a semi-ellipse.

Another aspect of the present disclosure provides an electronic equipment, where the electronic equipment includes the display module. A working principle of the electronic equipment is similar to a working principle of the display module, and details are not described herein again.

In one embodiment, the electronic equipment includes, but is not limited to, a mobile phone, a tablet computer, a computer display, a game machine, a television, a display screen, a wearable device, and other living appliances or household appliances having a display function.

The present disclosure provides the display module and the electronic equipment. The display module includes: a display panel including a first notch near a boundary of the display panel; a touch layer disposed over the display panel; and a touch flexible circuit board electrically connected to the touch layer, where the touch flexible circuit board is disposed adjacent to the first notch and is bent to a side of the display panel away from the touch layer. In the present disclosure, a width of a bending section of a lower border of the display panel is reduced by setting the touch flexible circuit board in a notch area of the special-shaped screen, thereby narrowing the lower border of the display module, and implementing a narrow border design.

In conclusion, although the present disclosure has been described with reference to the preferred embodiments thereof, it is apparent to those skilled in the art that a variety of modifications and changes may be made without departing from the scope of the present disclosure which is intended to be defined by the appended claims.

What is claimed is:

1. A display module, comprising:
   a display panel comprising a first notch near a boundary of the display panel;
   a touch layer disposed over the display panel; and
   a touch flexible circuit board electrically connected to the touch layer;
   wherein the touch flexible circuit board is disposed adjacent to the first notch and is bent to a side of the display panel away from the touch layer;
   wherein the touch flexible circuit board comprises a first bending area;
   wherein an orthographic projection of the first bending area on the first notch is located within the first notch;
   wherein the display panel comprises a flexible substrate; and the flexible substrate comprises a second bending area, and the second bending area is bent to the side of the display panel away from the touch layer; and wherein the second bending area is disposed near the first notch, and another orthographic projection of the second bending area on the first notch is located within the first notch.

2. The display module as claimed in claim 1, wherein the second bending area comprises a first area, a second area, and a third area, the first area and the third area are adjacent to the backplane, and the second area is located between the first area and the third area; and a radius of curvature of the first area is greater than a radius of curvature of the second area, and a radius of curvature of the third area is greater than the radius of curvature of the second area.

3. The display module as claimed in claim 1, wherein a bending radius of the first bending area is greater than a bending radius of the second bending area.

4. The display module as claimed in claim 1, wherein the touch flexible circuit board is electrically connected to the touch layer by an anisotropic conductive adhesive.

5. The display module as claimed in claim 1, wherein a shape of the first notch comprises one of a rectangle, a square, or a semi-oval shape.

6. An electronic equipment, comprising a display module, wherein the display module comprises:

a display panel comprising a first notch near a boundary of the display panel;

a touch layer disposed over the display panel; and a touch flexible circuit board electrically connected to the touch layer;

wherein the touch flexible circuit board is disposed adjacent to the first notch and is bent to a side of the display panel away from the touch layer;

wherein the touch flexible circuit board comprises a first bending area; and wherein an orthographic projection of the first bending area on the first notch is located within the first notch;

wherein the display panel comprises a flexible substrate; and the flexible substrate comprises a second bending area, and the second bending area is bent to the side of the display panel away from the touch layer; and wherein the second bending area is disposed near the first notch, and another orthographic projection of the second bending area on the first notch is located within the first notch.

7. The electronic equipment as claimed in claim 6, wherein the second bending area comprises a first area, a second area, and a third area, the first area and the third area are adjacent to the backplane, and the second area is located between the first area and the third area; and a radius of curvature of the first area is greater than a radius of curvature of the second area, and a radius of curvature of the third area is greater than the radius of curvature of the second area.

8. The electronic equipment as claimed in claim 6, wherein a bending radius of the first bending area is greater than a bending radius of the second bending area.

9. The electronic equipment as claimed in claim 6, wherein the touch flexible circuit board is electrically connected to the touch layer by an anisotropic conductive adhesive.

10. The electronic equipment as claimed in claim 6, wherein a shape of the first notch comprises one of a rectangle, a square, or a semi-oval shape.

* * * * *